United States Patent [19]

Zhou

[11] Patent Number: 5,566,419

[45] Date of Patent: Oct. 22, 1996

[54] WINDSHIELD WIPER SYSTEM FOR CURVED WINDSHIELDS

[75] Inventor: Peter S. Zhou, Dayton, Ohio

[73] Assignee: ITT Automotive Electrical Systems, Inc., Auburn Hills, Mich.

[21] Appl. No.: 395,095

[22] Filed: Feb. 27, 1995

[51] Int. Cl.⁶ .................................. B60S 1/34; B60S 1/32
[52] U.S. Cl. ......................... 15/250.352; 15/250.351; 15/250.34
[58] Field of Search ...................... 15/250.351, 250.352, 15/250.31, 250.3, 250.202, 250.34

[56] References Cited

U.S. PATENT DOCUMENTS

| | | | |
|---|---|---|---|
| 1,250,468 | 12/1917 | Kales | 15/250.202 |
| 1,573,618 | 2/1926 | Laganke | 15/250.351 |
| 1,626,629 | 5/1927 | Sayre | 15/250.34 |
| 1,681,724 | 8/1928 | Demand | 15/230.202 |
| 1,701,105 | 2/1929 | Folberth et al. | 15/250.34 |
| 2,613,385 | 10/1952 | Wylie | 15/250.351 |
| 2,722,708 | 11/1955 | Parkes | 15/250.34 |
| 3,387,316 | 6/1968 | Pearse | 15/250.34 |
| 3,480,985 | 12/1969 | Forster | 15/250.34 |

*Primary Examiner*—Gary K. Graham
*Attorney, Agent, or Firm*—Ratner & Prestia

[57] ABSTRACT

A windshield wiper system in which a flexible cantilever arm to which a wiper blade is attached is preloaded against a rigid support. An additional preload is induced in the cantilever arm as the wiper system is installed on a vehicle with the wiper blade in the horizontal inwipe position and bearing against the windshield. This creates an initial separation between the cantilever arm and the rigid support. As the rigid support and the cantilever arm move together from the horizontal inwipe position to the vertical outwipe position, the separation between the rigid support and the cantilever arm decreases, so that, with the increased contact between the rigid support and the cantilever arm, there is a change in the cantilever arm support location and a shortening of the cantilever arm beam. Conversely, as the rigid support and the cantilever arm move together from the vertical outwipe position to the horizontal inwipe position, the separation between the rigid support and the cantilever arm increases, so that, with the decreased contact between the rigid support and the cantilever arm, there is a change in the cantilever arm support location and a lengthening the cantilever arm beam. In this way, the contact and pressure between wiper blade and the windshield being cleaned is maintained constant or substantially constant as the wiper blade sweeps across the windshield.

8 Claims, 2 Drawing Sheets

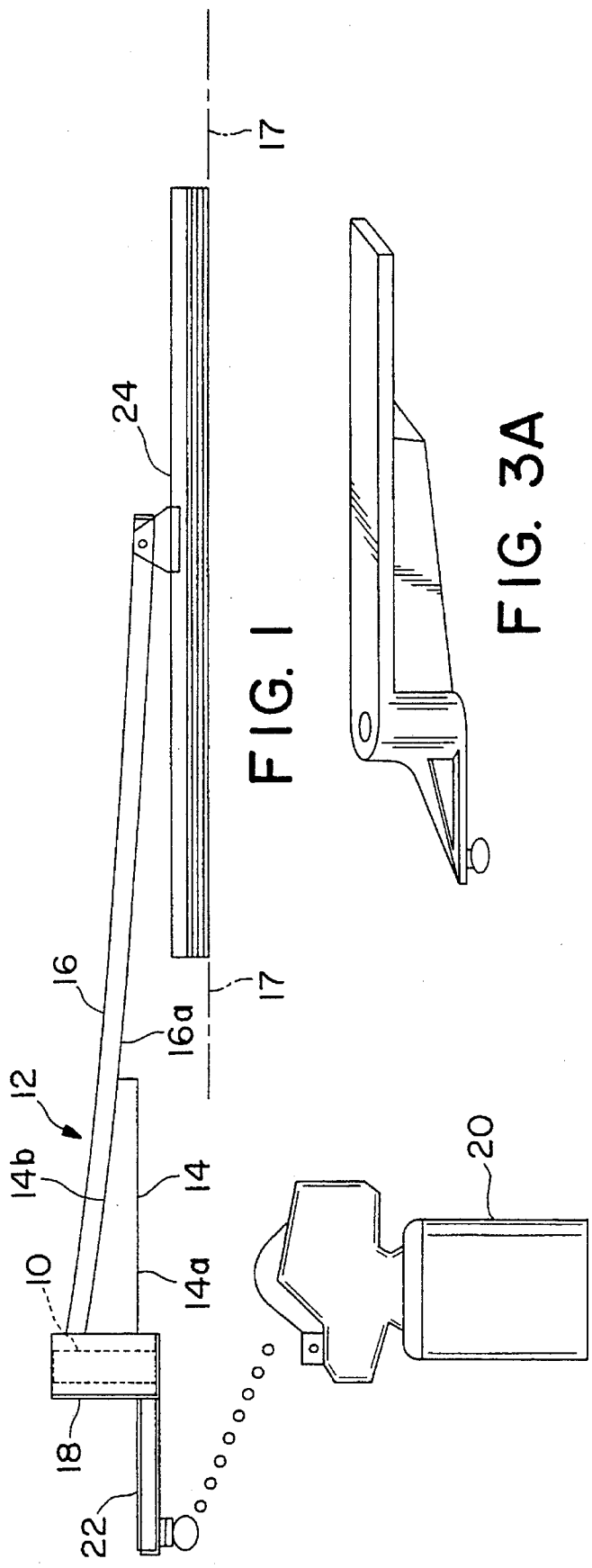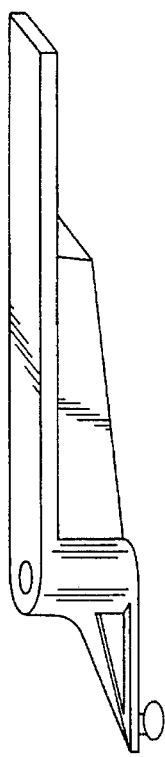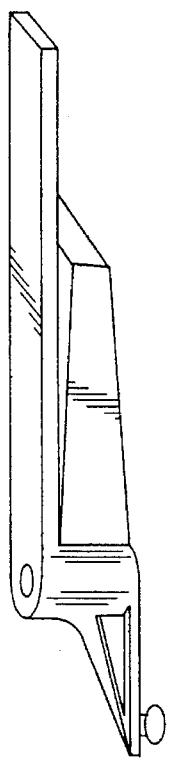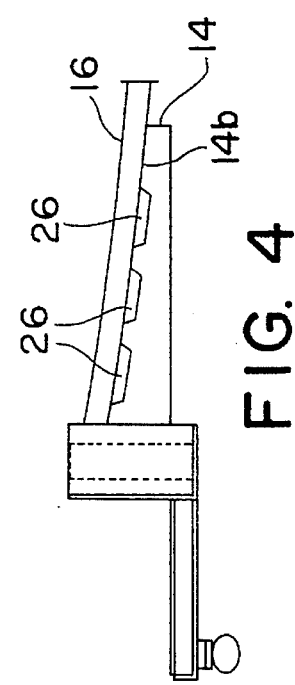

5,566,419

WINDSHIELD WIPER SYSTEM FOR CURVED WINDSHIELDS

TECHNICAL FIELD

The present invention relates, in general, to vehicle windshield wiping and, in particular, to a wiper system which provides substantially constant force of a windshield wiper blade against the windshield being wiped.

BACKGROUND OF THE INVENTION

In order to effectively wipe a windshield, the wiper blade must maintain contact, under constant or substantially constant pressure, with the windshield being wiped as the wiper blade and the wiper arm which carries the wiper blade oscillate between a horizontal "inwipe" position and a vertical "outwipe" position. Otherwise, portions of the windshield will not be wiped or will not be wiped effectively if the pressure of the wiper blade against the windshield varies. The requirement to maintain the contact of the wiper blade against the windshield at substantially constant pressure is more difficult to satisfy with highly curved and aerodynamic windshields which are very common because of the increasing emphasis on more efficient fuel consumption.

Typically, the wiper arm unit consists of a base which is fixed to an oscillating post of the wiper drive mechanism and a wiper arm which pivots with the base and to which the wiper blade is attached. A tension spring urges the wiper blade against the windshield, so that as the wiper arm and wiper blade oscillate between the inwipe and outwipe positions, the spring expands and contracts and the wiping pressure varies. A compromise value for the wiping pressure is tolerated, higher at some points in the wipe pattern and lower at others.

Another, but less common, construction of the wiper arm unit includes a cantilevered wiper arm which maintains wiping pressure between the wiper blade and the windshield due to the deflection of the arm itself rather than from a separate spring. The same problem still exists, however, because the deflection of the arm will increase and decrease as the arm deflects.

SUMMARY OF THE INVENTION

A windshield wiper system, constructed in accordance with the present invention, includes a wiper post and drive means for imparting oscillatory movement to the wiper post. This windshield wiper system also includes a wiper arm unit mounted to the wiper post for oscillatory movement with the wiper post and having a rigid support and a flexible cantilever arm. The rigid support has a curved surface and the cantilever arm is fixed to the rigid support with a preload induced in the cantilever arm as a surface of the cantilever arm adjacent the curved surface of the rigid support conforms to the curved surface of the rigid support and the cantilever arm deflects. The surface of the cantilever arm is movable toward and away from the curved surface of the rigid support in directions perpendicular to the oscillatory movement of the wiper arm unit upon changes in deflection of the cantilever arm. The separation between the curved surface of the rigid support and the surface of the cantilever arm decreases as the rigid support and the cantilever arm move from a horizontal inwipe position to a vertical outwipe position and increases as the rigid support and the cantilever arm move from a vertical outwipe position to a horizontal inwipe position. A wiper system, constructed in accordance with the present invention, further includes a wiper blade assembly mounted to the cantilever arm.

BRIEF DESCRIPTION OF THE DRAWING

FIG. 1 is a plan view of a first embodiment of a windshield wiper system constructed in accordance with the present invention.

FIGS. 3A and 3B are perspective views of the FIG. 1 embodiment of the invention showing the changing relative positions of parts as the wiper blade undergoes movement to clean a windshield.

FIGS. 4 is a plan view of a second embodiment of a windshield wiper system constructed in accordance with the present invention.

DETAILED DESCRIPTION OF THE INVENTION

Figure 2A:
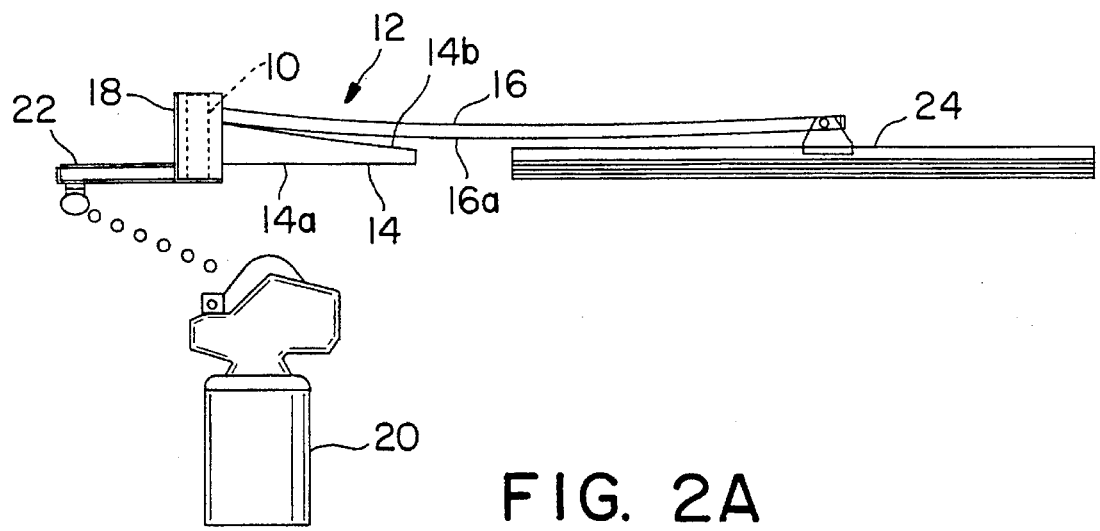
FIGS. 2A, 2B and 2C are plan views, similar to FIG. 1, showing the changing relative positions of parts of the FIG. 1 embodiment of the invention as the wiper blade undergoes movement to clean a windshield.
Figure 2B:
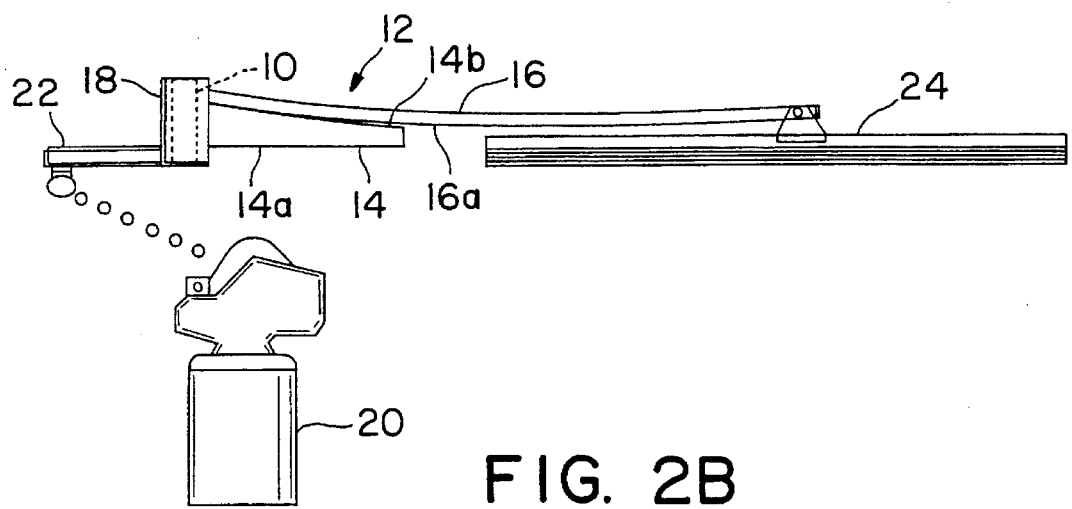
Figure 2C:
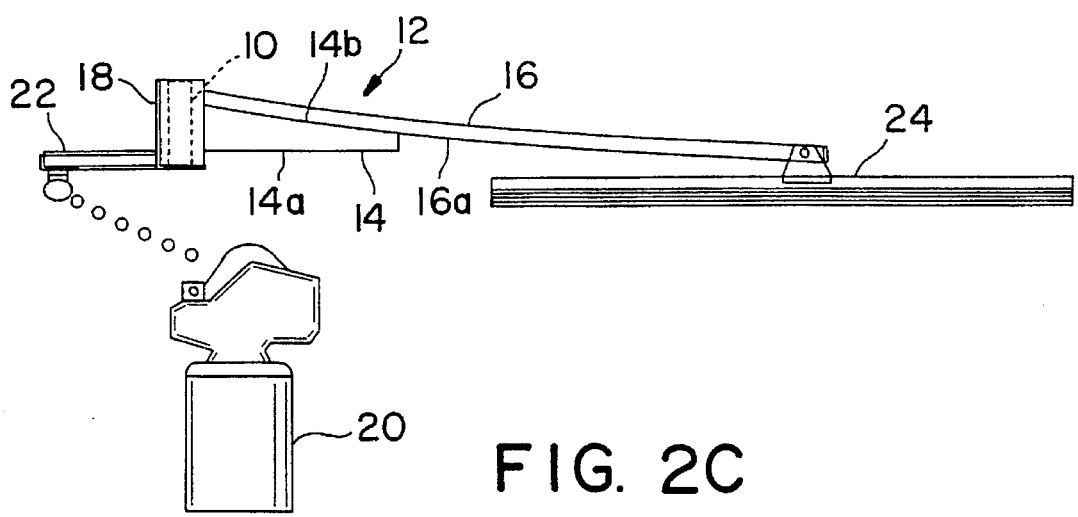

Referring to FIGS. 1, 2A, 2B, 2C, 3A and 3B, a windshield wiper system, constructed in accordance with the present invention, includes a wiper post 10 and drive means for imparting oscillatory movement to the wiper post. The drive means are represented by a motor 20 which can be an coupled, in a conventional manner, to a drive arm 22 which, in turn, is connected to wiper post 10 to oscillate the wiper post.

A windshield wiper system, constructed in accordance with the present invention, further includes a wiper arm unit 12 mounted to wiper post 10 for oscillatory movement (i.e. into and out from the plane of the drawing) of the wiper arm unit with the wiper post. Wiper arm unit 12 has a rigid support 14 and a flexible cantilever arm 16 and can include a sleeve 18 which fits over wiper post 10 and by which the wiper arm unit is mounted to the wiper post for oscillatory movement.

Rigid support 14 has a first surface 14a adapted to face a windshield to be wiped (shown by dotdash lines 17 FIG. 1) and a curved surface 14b, opposite from surface 14a. Cantilever arm 16 is flexible and initially is flat. As cantilever arm 16 is fixed to rigid support 14, a preload is induced in the cantilever arm as a surface 16a of the cantilever arm adjacent curved surface 14b of the rigid support conforms to the curved surface of the rigid support and the cantilever arm deflects.

Surface 16a of cantilever arm 16 is movable toward and away from curved surface 14b of rigid support 14 in directions perpendicular to the oscillatory movement of wiper arm unit 12 upon changes in deflection of the cantilever arm. As shown most clearly by FIGS. 2A, 2B and 2C, the separation between curved surface 14b of rigid support 14 and surface 16a of cantilever arm 16 decreases from a maximum separation at a horizontal inwipe position of wiper arm unit 12, represented by FIG. 2A, through an intermediate separation at an intermediate wipe position of the wiper arm unit, represented by FIG. 2B, to a minimum or no separation at a vertical outwipe position of the wiper arm unit, represented by FIG. 2C. The separation between curved surface 14b of rigid support 14 and surface 16a of cantilever arm 16 increases as the rigid support and the cantilever arm move from the vertical outwipe position to the horizontal inwipe position.

A windshield wiper system, constructed in accordance with the present invention, further includes a wiper blade assembly 24 mounted to cantilever arm 16. Wiper blade assembly can be of conventional construction and is attached to cantilever arm 16 by suitable means.

The relationship between rigid support 14 and cantilever arm 16 results in constant or substantially constant contact and pressure between wiper blade assembly 24 and the windshield being cleaned. This is accomplished by appropriate selection of the curvature of curved surface 14b of rigid support 14, the flexibility of the cantilever arm 16, the preload induced in the cantilever arm as the cantilever arm is fixed to the rigid support, and an additional preload induced in the cantilever arm when the windshield wiper system is installed on a vehicle with wiper blade assembly 24 bearing against the windshield to be cleaned such that there is an initial separation between curved surface of rigid support 14 and surface 16a of the cantilever arm with the wiper arm in the horizontal inwipe position. As rigid support 14 and cantilever arm 16 move together from the horizontal inwipe position to the vertical outwipe position, the separation between curved surface 14b of rigid support 14 and surface 16a of cantilever arm 16 decreases, so that, with the increased contact between curved surface 14b of rigid support 14 and surface 16a of cantilever arm 16, there is a change in the cantilever arm support location and a shortening of the cantilever arm beam. Conversely, as rigid support 14 and cantilever arm 16 move together from the vertical outwipe position to the horizontal inwipe position, the separation between curved surface 14b of rigid support 14 and surface 16a of cantilever arm 16 increases, so that, with the decreased contact between curved surface 14b of rigid support 14 and surface 16a of cantilever arm 16, there is a change in the cantilever arm support location and a lengthening of the cantilever arm beam. In this way, the contact and pressure between wiper blade assembly 24 and the windshield being cleaned is maintained constant or substantially constant as the wiper blade assembly sweeps across the windshield. The following is an explanation of how this result is achieved.

The predeflection $\delta_0$ of the cantilever arm, relative to the windshield being cleaned, when the cantilever arm is in the vertical outwipe position (i.e. FIG. 2C) is:

$$\delta_0 = \frac{F_0 l_0^3}{3EI} \quad (1)$$

where $F_0$ is the force of the wiper blade against the windshield at this position of the cantilever arm; $l_0$ is the length of the cantilever arm beam at this position of the cantilever arm; E is Young's modulus; and I is the area moment of inertia.

The deflection $\delta_0 + \delta_1$ of the cantilever arm, relative to the windshield being cleaned, when the cantilever arm is between the vertical outwipe position and the horizontal inwipe position (i.e. FIG. 2B) is:

$$\delta_0 + \delta_1 \frac{F_1 l_1^3}{3EI} \quad (2)$$

where $F_1$ is the force of the wiper blade against the windshield at this position of the cantilever arm; $l_1$ is the length of the cantilever arm beam at this position of the cantilever arm; E is Young's modulus; and I is the area moment of inertia.

The deflection $\delta_0 + \delta_2$ of the cantilever arm, relative to the windshield being cleaned, when the cantilever arm is at the horizontal inwipe position (i.e. FIG. 2A) is:

$$\delta_0 + \delta_1 \frac{F_2 l_2^3}{3EI} \quad (3)$$

where $F_2$ is the force of the wiper blade against the windshield at this position of the cantilever arm; $l_2$ is the length of the cantilever arm beam at this position of the cantilever arm; E is Young's modulus; and I is the area moment of inertia.

Letting:

$$F_0 = F_1 = F_2 \quad (4)$$

Then:

$$\frac{\delta_0}{l_0^3} = \frac{\delta_0 + \delta_1}{l_1^3} = \frac{\delta_0 + \delta_2}{l_2^3} \quad (5)$$

Or:

$$\frac{\delta_0 + \delta_1}{\delta_0} = \frac{l_1^3}{l_0^3} \; ; \text{and} \quad (6)$$

$$\frac{\delta_0 + \delta_2}{\delta_0} = \frac{l_2^3}{l_0^3} \quad (7)$$

At any deflection $\delta$ with a corresponding l:

$$\frac{\delta_0 + \delta}{\delta_0} = \frac{l^3}{l_0^3} \quad (8)$$

Or:

$$\frac{\delta}{\delta_0} = \left(\frac{l}{l_0}\right)^3 - 1 \quad (9)$$

By forming curved surface 14b of rigid support 14 to produce deflections according to function (9), the pressure of wiper blade assembly 24 against the windshield being cleaned, as the wiper blade sweeps across the windshield, will be constant or substantially constant.

For the embodiment of the invention illustrated by FIGS. 1, 2A, 2B, 2C, 3A and 3B, curved surface 14b of support 14 and surface 16a of cantilever arm 16 are continuous. As shown by FIG. 4, curved surface 14b of support 14 can be interrupted by the formation of recesses 26.

While there have been described preferred embodiments of the present invention, it will be obvious to those skilled in the art that various changes and modifications may be made without departing from the spirit and scope of the invention as defined in the following claims.

What is claimed:

1. A windshield wiper system comprising:

a wiper post;

drive means for imparting oscillatory movement to said wiper post;

a wiper arm unit mounted to said wiper post for oscillatory movement with said wiper post between a horizontal inwipe position and a vertical outwipe position, said unit having:

(a) a rigid support having a curved surface, said support fixed to said post, and (b) a flexible cantilever arm fixed to said rigid support with a preload induced in said cantilever arm such that a surface of said cantilever arm adjacent said curved surface of said rigid support conforms to said curved surface of said rigid support, said surface of said cantilever arm movable away from said curved surface of said rigid support in a direction perpendicular to the oscillatory movement of said wiper arm unit upon deflection of said cantilever arm, with the separation between said curved surface of said rigid support and said surface of said cantilever arm increasing as said rigid support and said cantilever arm move from said vertical outwipe position to said horizontal inwipe position and decreasing as said rigid support and said cantilever arm move from said horizontal inwipe position to said vertical outwipe position; and a wiper blade assembly mounted to said cantilever arm.

2. A windshield wiper system according to claim 1 wherein the curvature of said curved surface of said rigid support is formed according to the function:

$$\frac{\delta}{\delta_0} = \left(\frac{l}{l_0}\right)^3 - 1$$

where $\delta$ is the deflection of said cantilever arm, relative to a windshield being cleaned, as said cantilever arm sweeps across a windshield being cleaned; $\delta_0$ is the deflection of said cantilever arm, relative to the windshield to be cleaned, when said cantilever arm is in the vertical outwipe position; $l$ is the length of the cantilever arm beam as said cantilever arm sweeps across the windshield being cleaned; $l_0$ is the length of the cantilever arm beam when said cantilever arm is in the vertical outwipe position.

3. A windshield wiper system according to claim 2 wherein said curved surface of said rigid support and said surface of said cantilever arm are continuous.

4. A windshield wiper system according to claim 2 wherein said curved surface of said rigid support is interrupted and said surface of said cantilever arm is continuous.

5. A windshield wiper system according to claim 2 wherein said wiper arm unit also includes a sleeve fitted over and fixed to said wiper post and to which said rigid support and said cantilever arm are fixed.

6. A windshield and windshield wiper system combination comprising:

a windshield; and a windshield wiper system including:
  (a) a wiper post,
  (b) drive means for imparting oscillatory movement to said wiper post,
  (c) a wiper arm unit mounted to said wiper post for oscillatory movement with said wiper post between a horizontal inwipe position and a vertical outwipe position, said unit having:
    (1) a rigid support having a curved surface, said support fixed to said post, and
    (2) a flexible cantilever arm fixed to said rigid support with a first preload induced in said cantilever arm such that a surface of said cantilever arm adjacent said curved surface of said rigid support conforms to said curved surface of said rigid support, said surface of said cantilever arm movable away from said curved surface of said rigid support in a direction perpendicular to the oscillatory movement of said wiper arm unit upon deflection of said cantilever arm, with the separation between said curved surface of said rigid support and said surface of said cantilever arm increasing as said rigid support and said cantilever arm move from said vertical outwipe position to said horizontal inwipe position and decreasing as said rigid support and said cantilever arm move from said horizontal inwipe position to said vertical outwipe position, and (d) a wiper blade assembly mounted to said cantilever arm and bearing against said windshield to induce a second preload in said cantilever arm and create a separation between said curved surface of said rigid support and said surface of said cantilever arm while said cantilever arm is in the horizontal inwipe position.

7. A windshield and windshield wiper system combination according to claim 6 wherein the curvature of said curved surface of said rigid support is formed according to the function:

$$\frac{\delta}{\delta_0} = \left(\frac{l}{l_0}\right)^3 - 1$$

where $\delta$ is the deflection of said cantilever arm, relative to a windshield being cleaned, as said cantilever arm sweeps across a windshield being cleaned; $\delta$ is the deflection of said cantilever arm, relative to the windshield to be cleaned, when said cantilever arm is in the vertical outwipe position; $l$ is the length of the cantilever arm beam as said cantilever arm sweeps across the windshield being cleaned; $l_0$ is the length of the cantilever arm beam when said cantilever arm is in the vertical outwipe position.

8. A windshield and windshield wiper system combination according to claim 7 wherein said wiper arm unit also includes a sleeve fitted over and fixed to said wiper post and to which said rigid support and said cantilever arm are fixed.

* * * * *

UNITED STATES PATENT AND TRADE MARK OFFICE
CERTIFICATE OF CORRECTION

PATENT NO.   : 5,566,419
DATED        : October 22, 1996
INVENTOR(S)  : Peter S. Zhou It is certified that error appears in the above-identified patent and that said Letters Patent is hereby corrected as shown below:

In column 6, line 35, delete "$\delta$" and insert --$\delta_0$--.

Signed and Sealed this

Eighteenth Day of February, 1997

Attest:

BRUCE LEHMAN

Attesting Officer  Commissioner of Patents and Trademarks